United States Patent
Wang

(10) Patent No.: US 8,818,655 B1
(45) Date of Patent: Aug. 26, 2014

(54) SPLIT ELECTRONIC TRANSMISSION RANGE SELECTION SYSTEMS AND METHODS

(71) Applicant: GM Global Technology Operations LLC, Detroit, MI (US)

(72) Inventor: Orson S. Wang, Novi, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/788,448

(22) Filed: Mar. 7, 2013

(51) Int. Cl.
*G06F 19/00* (2011.01)
*G06F 17/00* (2006.01)
*B60W 10/02* (2006.01)
*B60W 10/18* (2012.01)

(52) U.S. Cl.
CPC .............. *G06F 17/00* (2013.01); *B60W 10/02* (2013.01); *B60W 10/18* (2013.01); *Y10S 428/91* (2013.01); *Y10S 428/913* (2013.01)
USPC .......... 701/51; 428/423.7; 428/480; 428/910; 428/913; 428/483; 424/443; 424/448; 340/988; 434/11; 434/14

(58) Field of Classification Search
CPC ....... B60K 2741/24; B60T 11/20; B60T 7/06; B60W 10/02; B60W 10/18
USPC .......... 701/51; 428/423.7, 480, 910, 913, 483, 428/336, 900, 928; 424/443, 448; 434/11, 434/14; 703/8; 455/39.73; 340/988; 252/301.16; 250/205; 192/21.5; 303/137
See application file for complete search history.

(56) References Cited

U.S. PATENT DOCUMENTS

| | | | | |
|---|---|---|---|---|
| 4,025,007 A | * | 5/1977 | Kaniut | 244/15 |
| 4,794,820 A | * | 1/1989 | Floeter | 477/34 |
| 5,042,133 A | * | 8/1991 | Peterson et al. | 29/404 |
| 5,908,460 A | | 6/1999 | Amisano et al. | |
| 5,974,351 A | | 10/1999 | Croft et al. | |
| 6,151,978 A | | 11/2000 | Huber | |
| 6,196,078 B1 | | 3/2001 | DeJonge et al. | |
| 7,301,478 B1 | | 11/2007 | Chinn et al. | |
| 7,490,528 B2 | | 2/2009 | Koski et al. | |
| 7,885,746 B2 | * | 2/2011 | Krishnan et al. | 701/51 |
| 8,155,847 B2 | | 4/2012 | Wang | 701/54 |
| 8,622,160 B2 | * | 1/2014 | Flowers | 180/65.1 |
| 2004/0249541 A1 | | 12/2004 | Kim | |
| 2006/0054366 A1 | * | 3/2006 | Priepke | 180/6.24 |
| 2006/0179962 A1 | * | 8/2006 | Katrak et al. | 74/335 |
| 2006/0229789 A1 | * | 10/2006 | Krishnan et al. | 701/51 |
| 2007/0191182 A1 | | 8/2007 | Koski et al. | |
| 2008/0064559 A1 | | 3/2008 | Cawthorne et al. | |
| 2009/0233765 A1 | | 9/2009 | Tao et al. | |

OTHER PUBLICATIONS

U.S. Appl. No. 14/088,738, filed Nov. 25, 2013, Orson S. Wang.

* cited by examiner

*Primary Examiner* — McDieunel Marc

(57) ABSTRACT

An electronic transmission range selection system of a vehicle includes first and second input devices and first and second modules. The first input device is user actuatable to request operation of a transmission in reverse, neutral, and drive. The first module generates first signals based on a first position of the first input device. The second input device is different than the first input device and is user actuatable to request operation of the transmission in park. The second module generates second signals based on a second position of the second input device.

18 Claims, 8 Drawing Sheets

SPLIT ELECTRONIC TRANSMISSION RANGE SELECTION SYSTEMS AND METHODS

FIELD

The present disclosure relates to electronic transmission control and more particularly to range selection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an electronic transmission range selection system is presented. Range selection is the act of selecting a gear range such as park, reverse, neutral, drive, low, or overdrive in a vehicle 100. The vehicle 100 includes a shifter module 112. The shifter module 112 is used by a driver to select a range.

The shifter module 112 may determine the position of a driver input using sensors. The driver input may include, for example, a lever, button, or paddle. Readings from the sensors may be transmitted to a shifter interpretation module (SIM) 110. The SIM 110 may then interpret the sensor readings and determine which range the driver selected. Based on the selected range, the SIM 110 may transmit a range request to an engine control module (ECM) 104 and a transmission control module (TCM) 106.

The ECM 104 controls an engine 102. The ECM 104 may use data from the engine 102 to control components of the vehicle 100. The TCM 106 may receive the range request in different ways. For example, the TCM 106 may receive the range request by direct connection or via a network. The TCM 106 uses the range request to control a transmission 108.

SUMMARY

An electronic transmission range selection system of a vehicle includes first and second input devices and first and second modules. The first input device is user actuatable to request operation of a transmission in reverse, neutral, and drive. The first module generates first signals based on a first position of the first input device. The second input device is different than the first input device and is user actuatable to request operation of the transmission in park. The second module generates second signals based on a second position of the second input device.

In further features, the electronic transmission range selection system further includes: a range request module that selectively sets a range request to one of reverse, neutral, drive, and park based on at least one of the first and second signals; and a transmission control module that controls the transmission based on the range request.

In still further features, the electronic transmission range selection system further includes a driver module that illuminates one of a reverse indicator, a neutral indicator, a drive indicator, and a park indicator based on the range request.

In yet further features, the first module includes at least two sensors that generate third signals based on the first position of the first input device. The first module generates the first signals based on the third signals.

In further features, the first module further includes: an analog to digital converter (ADC) module that selectively samples the third signals and that generates digital values based on the samples, respectively; and an encoding module that generates the first signals based on the digital values.

In still yet further features, the encoding module generates the first signals further based on actuation of a shift interlock input device.

In yet further features, the first module further includes: an analog to digital converter (ADC) module that selectively samples the third signals and that generates digital values based on the samples, respectively; a position module that determines a position of the first input device based on the digital values; and an encoding module that generates the first signals based on the position of the first input device.

In further features, the position module determines the position of the first input device further based on actuation of a shift interlock input device.

In yet further features, the second module includes at least two sensors that generate the second signals based on the second position of the second input device.

In still further features, the electronic transmission range selection system of further includes: an engine control module that selectively sets a range request to one of reverse, neutral, drive, and park based on at least one of the first and second signals and that selectively adjusts one or more operating parameters of an engine based on the range request; and a transmission control module that controls the transmission based on the range request.

An electronic transmission range selection method includes: request operation of a transmission in reverse, neutral, and drive using a first input device that is user actuatable; and generating first signals based on a first position of the first input device. The electronic transmission range selection method further includes: requesting operation of the transmission in park using a second input device that is different than the first input device and that is user actuatable; and generating second signals based on a second position of the second input device.

In further features, the electronic transmission range selection method further includes: selectively setting a range request to one of reverse, neutral, drive, and park based on at least one of the first and second signals; and controlling the transmission based on the range request.

In still further features, the electronic transmission range selection method further includes illuminating one of a reverse indicator, a neutral indicator, a drive indicator, and a park indicator based on the range request.

In yet further features, the electronic transmission range selection method further includes: generating third signals, using at least two sensors, based on the first position of the first input device; and generating the first signals based on the third signals.

In further features, the electronic transmission range selection method further includes: selectively sampling the third signals; generating digital values based on the samples, respectively; and generating the first signals based on the digital values.

In still further features, the electronic transmission range selection method further includes generating the first signals further based on actuation of a shift interlock input device.

In yet further features, the electronic transmission range selection method further includes: selectively sampling the third signals; generating digital values based on the samples, respectively; determining a position of the first input device based on the digital values; and generating the first signals based on the position of the first input device.

In further features, the electronic transmission range selection method further includes determining the position of the first input device further based on actuation of a shift interlock input device.

In still further features, the electronic transmission range selection method further includes generating, using at least two sensors, the second signals based on the second position of the second input device.

In yet further features, the electronic transmission range selection method further includes: selectively setting a range request to one of reverse, neutral, drive, and park based on at least one of the first and second signals; selectively adjusting one or more operating parameters of an engine based on the range request; and controlling the transmission based on the range request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Electronic transmission range selection is used in a vehicle to enable a user of the vehicle to select a gear range, such as park, neutral, reverse, or drive. The user could select the range via one driver input device, such as a park, reverse, neutral, drive lever (PRNDL). Sensors generate signals based on actuation of the one driver input device, and a range request is generated based on the signals.

For example, the signals could be translated into a range request by a control module, such as an engine control module (ECM) or a transmission control module (TCM), or could be translated into a range request by a shifter interpretation module that is external to the ECM and/or the TCM. The ECM may selectively adjust one or more engine operating parameters based on the range request, and the TCM may control a transmission based on the range request. However, if a fault is diagnosed in one or more of the sensors and/or in the module that performs the translation, the transmission may be maintained in park by default.

According to the present disclosure, the user selects drive, neutral, or reverse using a first driver input device, such as a lever or a joystick. The user selects park using a second driver input device, such as a park button or switch. A first module generates signals based on actuation of the first driver input device. A second module generates signals on actuation of the second driver input device. A control module, such as an engine control module, generates a range request based on the signals from the first and second modules.

A shift module including the first and second driver input devices and the first and second modules may increase vehicle availability. More specifically, the range request may be set to park by default when a fault is diagnosed in the second driver input device and/or the second module. Even when a fault is diagnosed in the second driver input device and/or the second module, however, the range request can still be generated reliably based on the signals generated based on actuation of the first driver input device. The reliability of the signals generated based on actuation of the first driver input device allows a driver to operate the vehicle in reverse, neutral, and drive despite a fault in the second driver input device and/or the second module.

Figure 1:
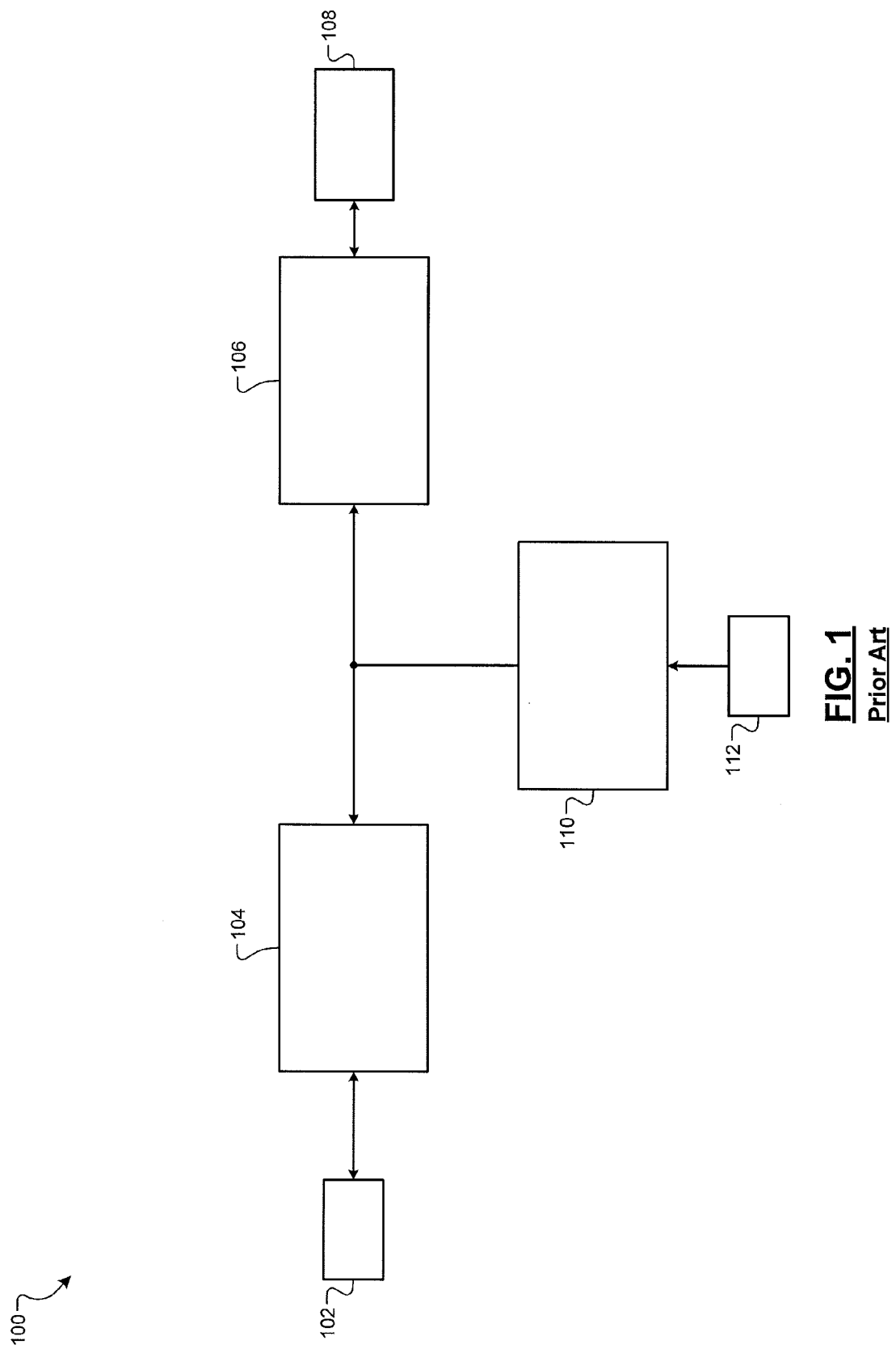
FIG. 1 is a functional block diagram of an example electronic transmission range selection system.
Figure 2:
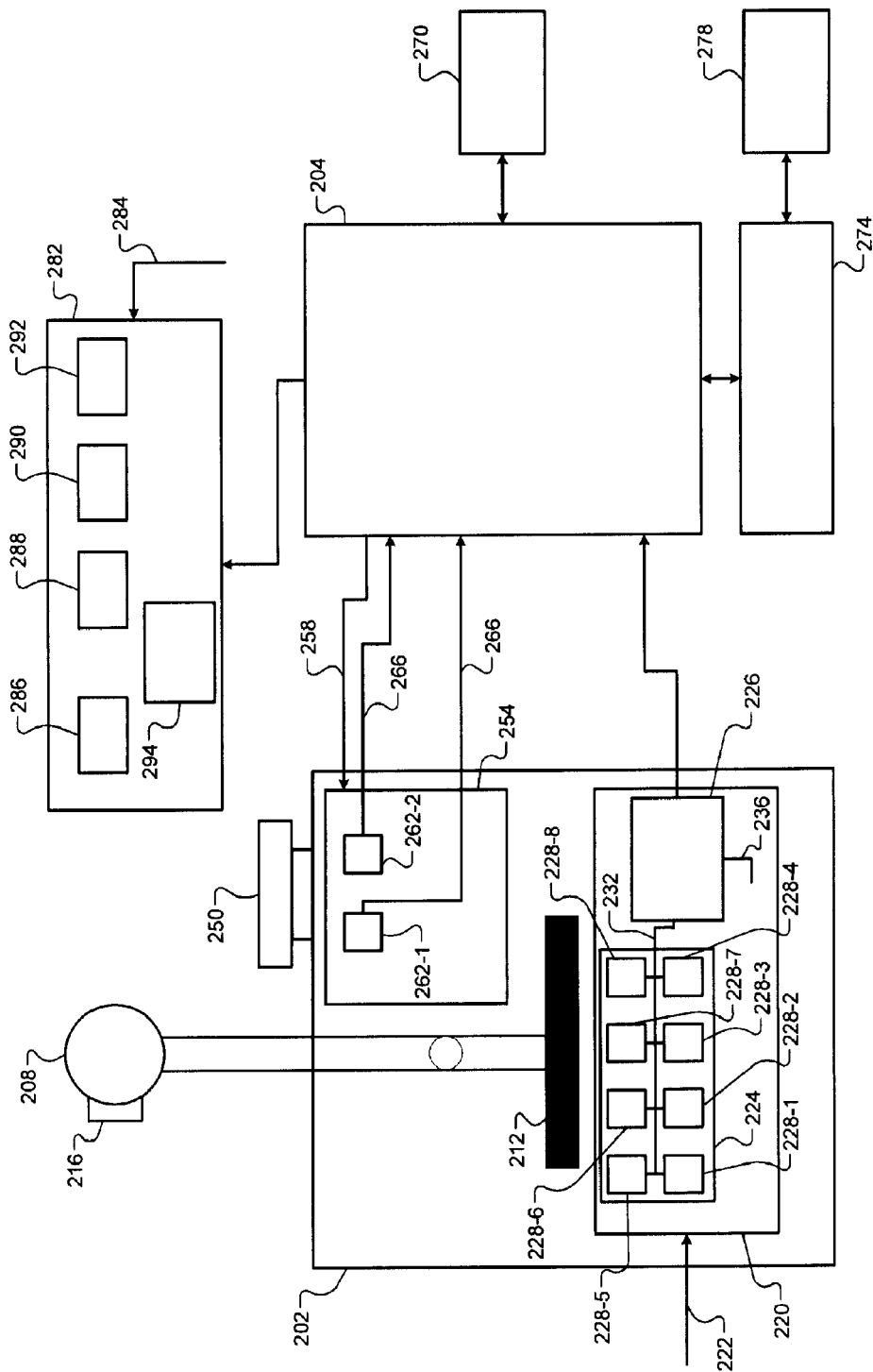
FIG. 2 is a functional block diagram of an example electronic transmission range selection system according to the present disclosure.

Referring now to FIG. 2, a functional block diagram of an example electronic transmission range selection system is presented. Electronic transmission range selection may be performed by connecting a shifter module 202 directly to a control module, such as an engine control module (ECM) 204, as shown in FIG. 2. In various implementations, the shifter module 202 may be directly connected to the ECM 204, such as via a network, cabling, or wirelessly. For example only, the connection may be made with a network such as a controller area network (CAN) or local interconnect network (LIN).

The shifter module 202 includes a first driver input device 208. For example only, as shown in FIG. 2, the first driver input device 208 may include a lever. The first driver input device 208 may include a magnetically encoded plate 212 that moves as the lever is actuated. While the first driver input device 208 is shown and discussed as including a lever, the first driver input device 208 may include a joystick and/or one or more other suitable actuators. The first driver input device 208 may also include a shift interlock device 216, such as a button or a switch. The driver selects reverse, neutral, or drive via the first driver input device 208. The driver may also select one or more other forward and/or reverse gears via the first driver input device 208.

A first module 220 generates signals based on driver input to the first driver input device 208. The first module 220 may receive power 222, such as 12 Volt power, from an external power source (not shown). The first module 220 may include a sensor module 224 and an output generating module 226. The sensor module 224 may include two or more sensors, such as sensors 228-1, 228-2, 228-3, 228-4, 228-5, 228-6, 228-7, and 228-8 ("sensors 228"). The sensors 228 generate signals 232, respectively, based on actuation of the first driver input device 208. For example only, the sensors 228 may include Hall-effect sensors and generate the signals 232 based on position of the magnetically encoded plate 212. In various implementations, the sensors 228 may include linear analog sensors that generate signals within a range based on the position of the first driver input device 208.

The output generating module 226 receives the signals 232 and receives a signal 236 generated based on actuation of the shift interlock device 216. For example only, the signal 236 may indicate whether the shift interlock device 216 is or is not currently being actuated.

Figure 3:
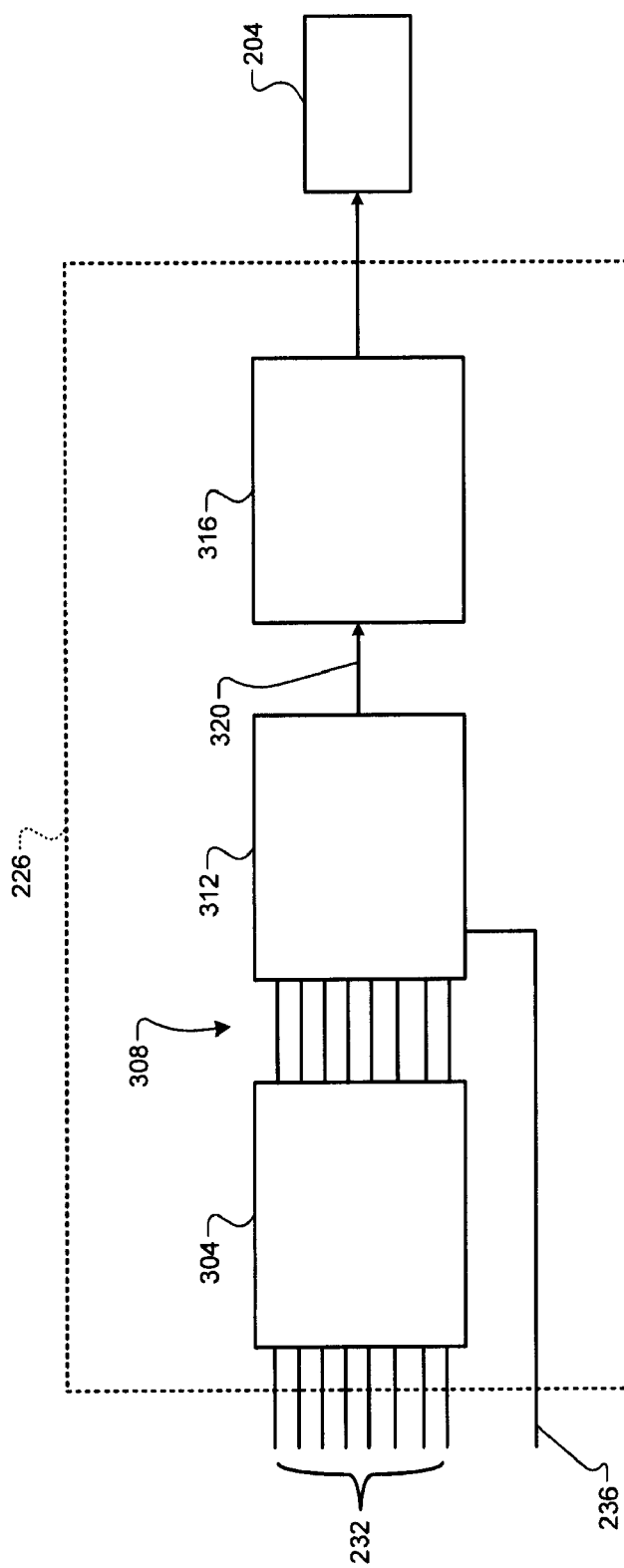
FIGS. 3 and 4 are a functional block diagrams of example implementations of an output generating module of a shifter module according to the present disclosure.

FIG. 3 includes a functional block diagram of an example implementation of the output generating module 226. Referring now to FIGS. 2 and 3, the output generating module 226 may include an analog to digital converter (ADC) module 304 that samples the signals 232 at a predetermined sampling rate and that converts the samples into digital values 308. The output generating module 226 may also include an encoding module 312 and a transceiver module 316.

The encoding module 312 may encode the digital values 308 and samples of the signal 236 to produce an encoded signal 320. The transceiver module 316 transmits the encoded signal 320 to the ECM 204, for example, using a CAN data protocol, a LIN data protocol, or another suitable serial data communication protocol. In such implementations, the ECM 204 decodes the received signal and determines a position of the first driver input device 208 based on the decoded signal.

The example shifter module 202 described and shown in the examples of FIGS. 2 and 3 may be less costly than a shifter module including a single module that generates signals indicating Park, Neutral, Drive, or Reverse ("a PRND" module). Such PRND modules, and the control modules that receive their outputs, generally each include two transceivers (for a total of four transceivers): one primary set and one redundant set. The example shifter module 202 described and shown in the examples of FIGS. 2 and 3 may be less costly than such a PRND module due to the lesser number of transceivers needed. Additionally, a single encoder and/or a single transceiver failure in a PRND module may render the entire PRND module unreliable and render a vehicle unavailable for use.

Figure 4:
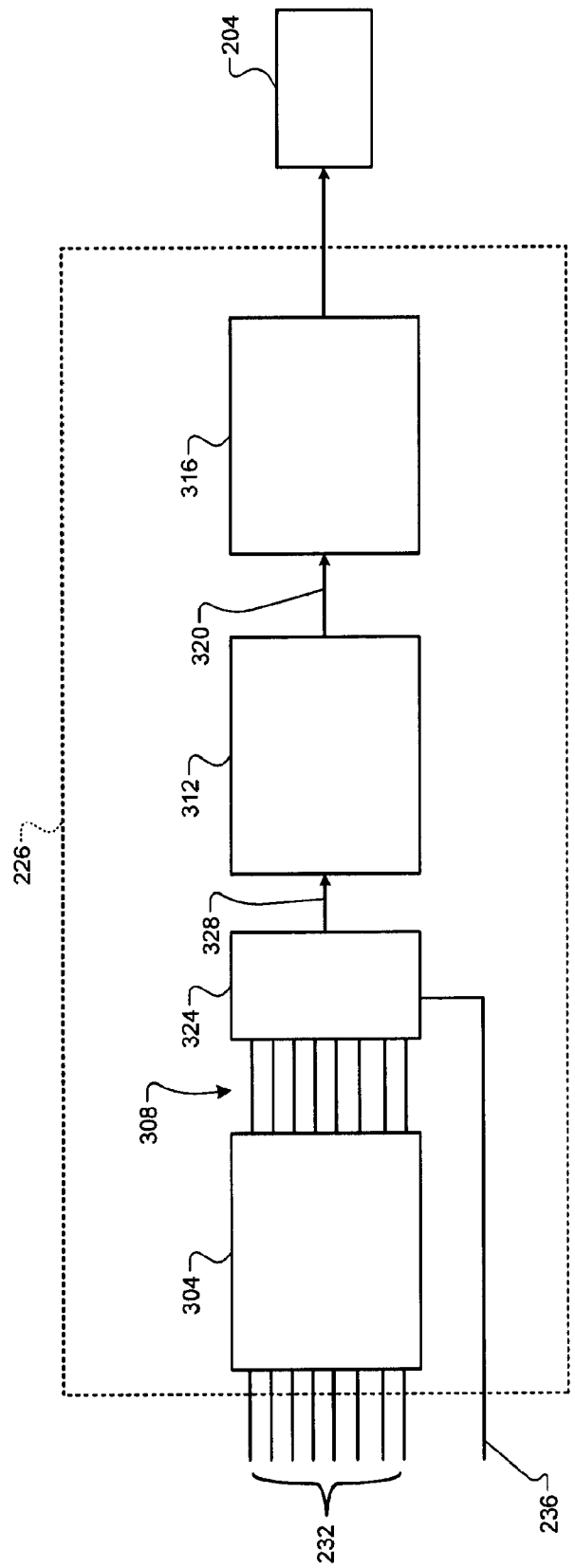

FIG. 4 includes another functional block diagram of an example implementation of the output generating module 226. Referring now to FIG. 4, the output generating module 226 may also include a position module 324 that generates a position signal 328 based on the digital values 308. The position signal 328 indicates a position of the first driver input device 208. The encoding module 312 encodes the position signal 328 to produce the encoded signal 320, and the transceiver module 316 transmits the encoded signal 320 to the ECM 204. In such implementations, the ECM 204 decodes the received signal and determines a position of the first driver input device 208 based on the decoded signal.

Relative to the example of FIG. 4, a greater number of suppliers may be capable of sourcing the output generating modules of FIG. 3 due to the omission of the position module 324. As discussed above, the ECM 204 will then decode the received signals and determine the position of the first driver input device 208.

Referring back to FIG. 2, the shifter module 202 also includes a second driver input device 250. The driver selects park via the second driver input device 250. For example only, as shown in FIG. 2, the second driver input device 250 may include a button. While the second driver input device 250 is shown and discussed as including a button, the second driver input device 250 may include a joystick, a switch, a lever, and/or one or more other suitable actuators.

A second module 254 receives power 258, such as positive and negative 5 Volt power, from the ECM 204. The second module 254 generates signals based on driver input to the second driver input device 250. The second module 254 may include one or more sensors, such as sensors 262-1 and 262-2 ("sensors 262"). The sensors 262 may be connected in a ladder arrangement in various implementations. The sensors 262 generate signals 266, respectively, based on actuation of the second driver input device 250.

The sensors 262 may output the signals directly to the ECM 204, as shown in FIG. 2. In such implementations, the ECM 204 may sample the signals at a predetermined sampling rate and convert the samples into digital values. The ECM 204 determines a position of the second driver input device 250 based on these digital values.

Figure 5:
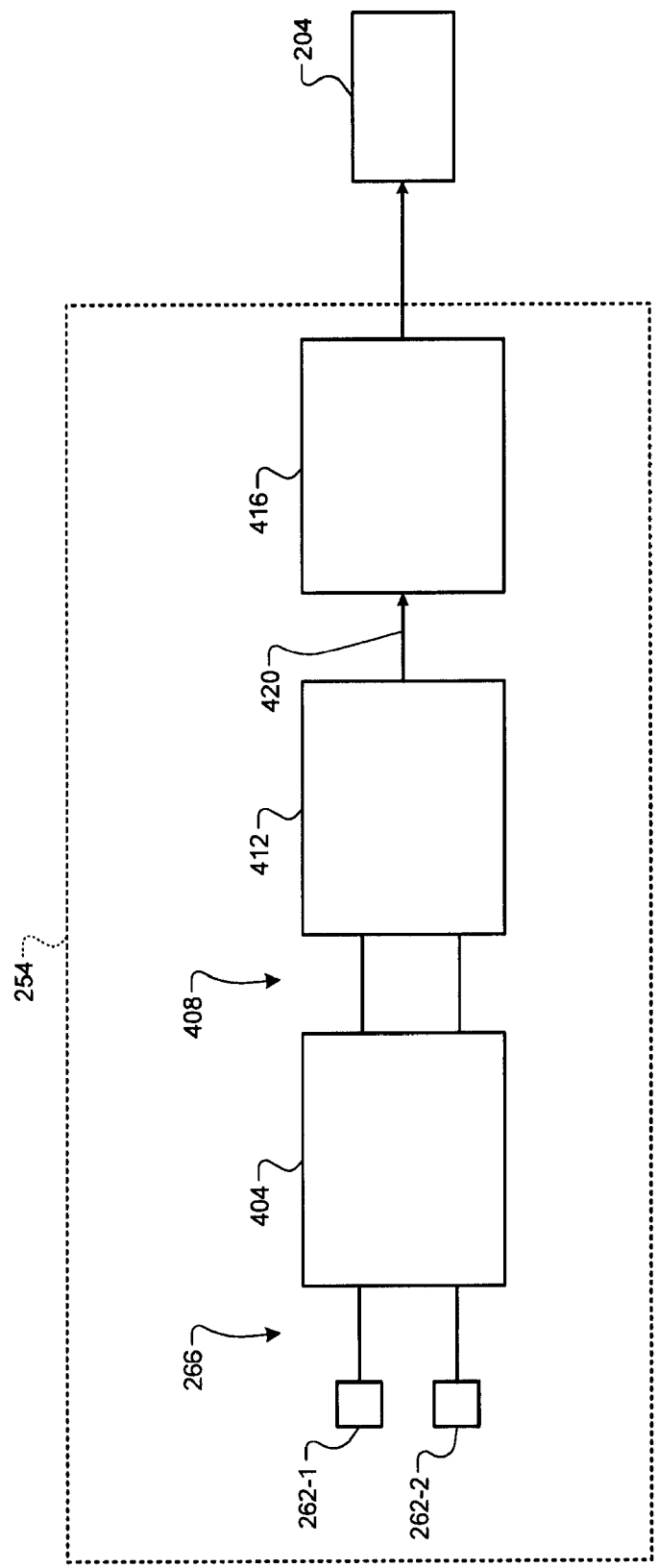
FIGS. 5 and 6 are functional block diagrams of example implementations of a second module of a shifter module according to the present disclosure.

In various implementations, the second module 254 may include an output generating module. FIG. 5 is a functional block diagram of an example implementation of the second module 254. Referring now to FIGS. 2 and 5, the second module 254 may include an analog to digital converter (ADC) module 404 that samples the signals 266 at a predetermined sampling rate and that converts the samples into digital values 408. The second module 254 may also include an encoding module 412 and a transceiver module 416.

The encoding module 412 may encode the digital values 408 to produce an encoded signal 420. The transceiver module 416 transmits the encoded signal 420 to the ECM 204, for example, using a CAN data protocol, a LIN data protocol, or another suitable serial data communication protocol. In such implementations, the ECM 204 decodes the received signal and determines a position of the second driver input device 250 based on the decoded signal.

Figure 6:
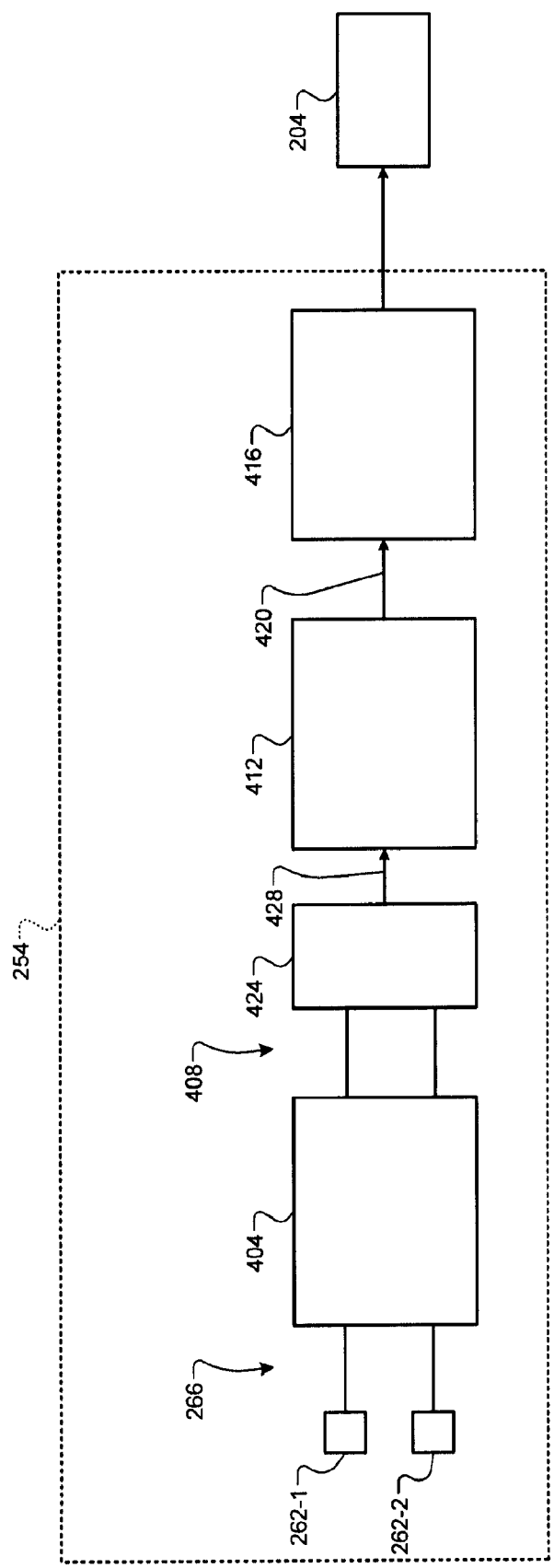

FIG. 6 includes another functional block diagram of an example implementation of the second module 254. Referring now to FIG. 6, a position module 424 may generate a position signal 428 based on the digital values 408. The position signal 428 indicates a position of the second driver input device 250. The encoding module 412 encodes the position signal 428 to produce the encoded signal 420, and the transceiver module 416 transmits the encoded signal 420 to the ECM 204. In such implementations, the ECM 204 decodes the received signal and determines the position of the second driver input device 250 based on the decoded signal.

Referring back to FIG. 2, the ECM 204 determines a range request based on the signals from the first module 220 and the signals from the second module 254. The range request may indicate, for example, one of park, reverse, neutral, and drive at a given time. The ECM 204 may selectively adjust one or more operating parameters of an engine 270 based on the range request.

The ECM 204 transmits the range request to a transmission control module (TCM) 274, and the TCM 274 controls operation of a transmission 278 based on the range request. For example, the TCM 274 may operate the transmission 278 to park the vehicle when the range request indicates park. The TCM 274 may operate the transmission 278 such that the vehicle can move in a reverse direction when the range request indicates reverse. The TCM 274 may operate the transmission 278 such that torque output by the engine 270 is not transferred to wheels of the vehicle when the range request indicates neutral. The TCM 274 may operate the transmission 278 such that the vehicle can move in a forward direction when the range request indicates drive.

The ECM 204 may also transmit the range request to a range indicator module 282. The range indicator module 282 may receive power 284, such as 12 Volt power, from an external power source (not shown). The range indicator module 282 may include a park indicator 286, a reverse indicator 288, a neutral indicator 290, a drive indicator 292, and a driver module 294.

The driver module 294 may illuminate one of the indicators 286-292 based on the range request. For example, the driver module 294 may illuminate the park indicator 286 when the range request indicates park. The driver module 294 may illuminate the reverse indicator 288 when the range request indicates reverse. The driver module 294 may illuminate the neutral indicator 290 when the range request indicates neutral. The driver module 294 may illuminate the drive indicator 292 when the range request indicates drive.

Figure 7:
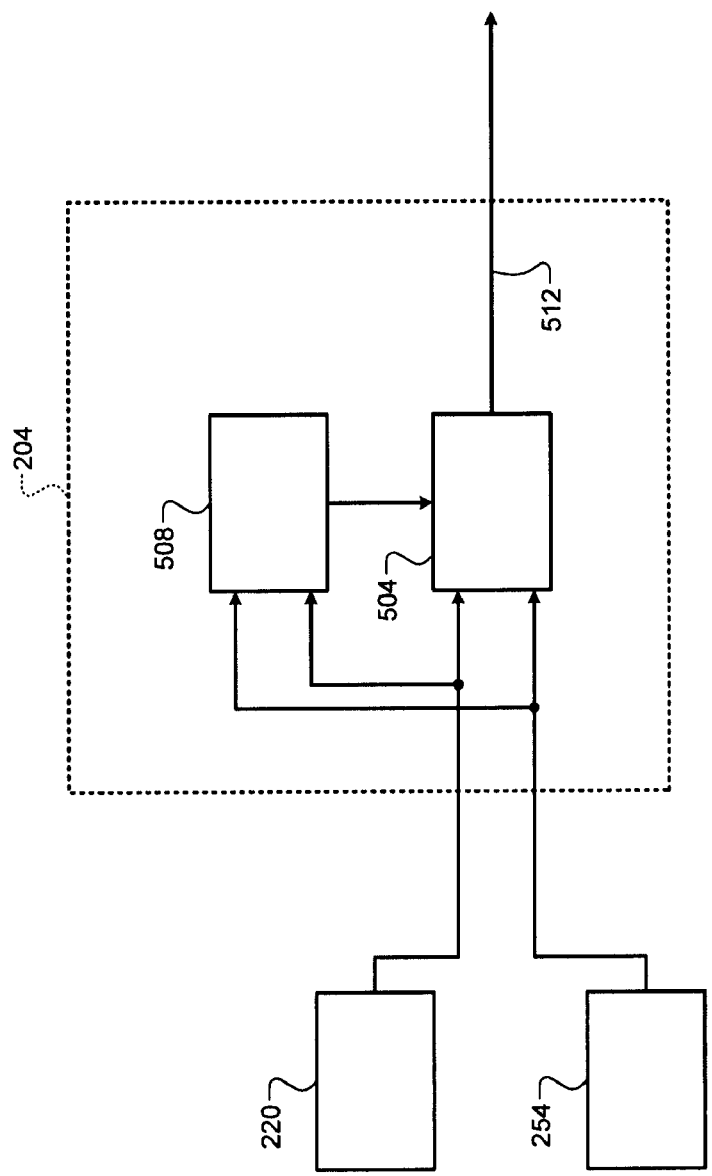
FIG. 7 is a functional block diagram of an example portion of an engine control module according to the present disclosure.

Referring now to FIG. 7, a functional block diagram of an example implementation of the ECM 204 including a range request module 504 and a diagnostic module 508 is presented.

While the range request module 504 and the diagnostic module 508 are shown and discussed as being implemented within the ECM 204, the range request module 504 and/or the diagnostic module 508 may be implemented in another suitable location, such as within the TCM 274 or in another module.

The diagnostic module 508 selectively diagnoses the presence of a fault in the first module 220. The diagnostic module 508 may determine whether a fault is present in the first module 220, for example, based on the signals from the first module 220. The diagnostic module 508 also selectively diagnoses the presence of a fault in the second module 254. The diagnostic module 508 may determine whether a fault is present in the second module 254, for example, based on the signals from the second module 254.

The range request module 504 generates the range request 512. When the vehicle is started (e.g., key on), the range request module 504 may set the range request 512 to park. While the vehicle is running (e.g., between key on and key off), the range request module 504 selectively changes the range request 512 based on the signals from the first module 220 and/or the signals from the second module 254.

When the diagnostic module 508 has diagnosed a fault in the second module 254, the range request module 504 may default to setting the range request 512 to indicate park. When a fault has not been diagnosed in the first module 220 and a fault has been diagnosed in the second module 254, the range request module 504 may selectively change the range request 512 based on the signals from the first module 220. For example, when the signals from the first module 220 indicate that the first driver input device 208 has been actuated to request reverse or drive, the range request module 504 may generate the range request 512 to indicate reverse or drive, respectively. In various implementations, the range request module 504 may require that the first driver input device 208 be actuated to request reverse or drive for a predetermined period before transitioning the range request 512 from indicating park to indicating reverse or drive. Because the first driver input device 208 and the first module 220 are implemented and generate signals independently of the second driver input device 250 and the second module 254, requests for use of drive, neutral, and reverse can be honored even though a fault has been diagnosed in the second module 254.

When a fault has been diagnosed in the first module 220, the range request module 504 may selectively transition the range request 512 to neutral or transition the range request 512 to neutral when the vehicle is stopped. If the range request 512 is set to drive when a fault is diagnosed in the first module 220 (and a fault has not been diagnosed in the second module 254), the range request module 504 may maintain the range request 512 in drive until the driver requests park via the second driver input device 250.

Figure 8:
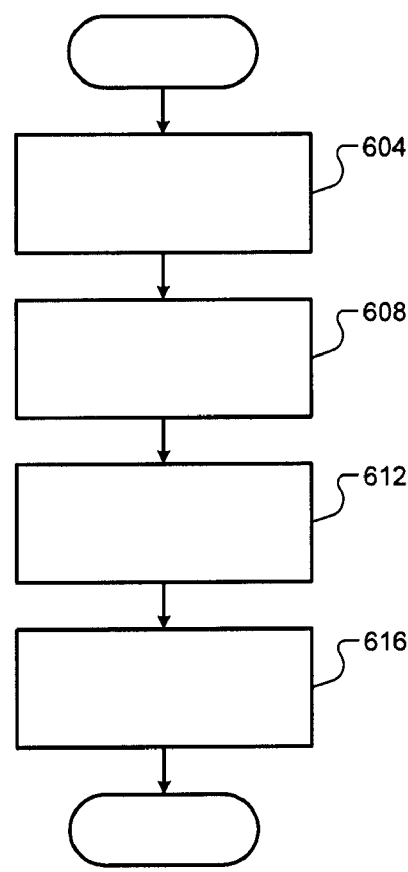
FIG. 8 is a flowchart depicting an example method of generating a range request according to the present disclosure.

Referring now to FIG. 8, a flowchart depicting an example method of generating a range request is presented. Control may begin with 604 where the first module 220 generates signals based on driver input to the first driver input device 208 and the shift interlock device 216 and the second module 254 generates signals based on driver input to the second driver input device 250. At 608, the range request module 504 receives the signals generated by the first and second modules 220 and 254.

At 612, the range request module 504 generates the range request 512 based on the signals generated by the first and second modules 220 and 254. Additionally or alternatively, the range request module 504 may generate the range request 512 based on one or more other signals, such as signals from the diagnostic module 508. At 616, the TCM 274 controls the transmission 278 based on the range request 512 and the driver module 294 controls which one of the indicators 286-292 is illuminated based on the range request 512. One or more other parameters may also be controlled based on the range request 512. For example, the ECM 204 may selectively adjust one or more operating parameters of the engine 270 based on the range request 512. While control is shown as ending after 616, FIG. 8 may be illustrative of one control loop, and control loops may be performed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An electronic transmission range selection system of a vehicle, comprising:
 a first input device that is user actuatable to request operation of a transmission in reverse, neutral, and drive;

a first module that generates first signals based on a first position of the first input device;

a second input device that is different than the first input device and that is user actuatable to request operation of the transmission in park; and a second module that generates second signals based on a second position of the second input device, wherein the first module includes at least two sensors that generate third signals based on the first position of the first input device, and wherein the first module generates the first signals based on the third signals.

2. The electronic transmission range selection system of claim 1 further comprising:

a range request module that selectively sets a range request to one of reverse, neutral, drive, and park based on at least one of the first and second signals; and a transmission control module that controls the transmission based on the range request.

3. The electronic transmission range selection system of claim 2 further comprising a driver module that illuminates one of a reverse indicator, a neutral indicator, a drive indicator, and a park indicator based on the range request.

4. The electronic transmission range selection system of claim 1 wherein the first module further includes:

an analog to digital converter (ADC) module that selectively samples the third signals and that generates digital values based on the samples, respectively; and an encoding module that generates the first signals based on the digital values.

5. The electronic transmission range selection system of claim 4 wherein the encoding module generates the first signals further based on actuation of a shift interlock input device.

6. The electronic transmission range selection system of claim 1 wherein the first module further includes:

an analog to digital converter (ADC) module that selectively samples the third signals and that generates digital values based on the samples, respectively;

a position module that determines a position of the first input device based on the digital values; and an encoding module that generates the first signals based on the position of the first input device.

7. The electronic transmission range selection system of claim 6 wherein the position module determines the position of the first input device further based on actuation of a shift interlock input device.

8. The electronic transmission range selection system of claim 1 wherein the second module includes at least two sensors that generate the second signals based on the second position of the second input device.

9. The electronic transmission range selection system of claim 1 further comprising:

an engine control module that selectively sets a range request to one of reverse, neutral, drive, and park based on at least one of the first and second signals and that selectively adjusts one or more operating parameters of an engine based on the range request; and a transmission control module that controls the transmission based on the range request.

10. An electronic transmission range selection method for a vehicle, comprising:

request operation of a transmission in reverse, neutral, and drive using a first input device that is user actuatable;

generating first signals based on a first position of the first input device;

requesting operation of the transmission in park using a second input device that is different than the first input device and that is user actuatable;

generating second signals based on a second position of the second input device; and generating third signals, using at least two sensors, based on the first position of the first input device, wherein generating the first signals includes generating the first signals based on the third signals.

11. The electronic transmission range selection method of claim 10 further comprising:

selectively setting a range request to one of reverse, neutral, drive, and park based on at least one of the first and second signals; and controlling the transmission based on the range request.

12. The electronic transmission range selection method of claim 11 further comprising illuminating one of a reverse indicator, a neutral indicator, a drive indicator, and a park indicator based on the range request.

13. The electronic transmission range selection method of claim 10 further comprising:

selectively sampling the third signals;

generating digital values based on the samples, respectively;

determining a position of the first input device based on the digital values; and generating the first signals based on the position of the first input device.

14. The electronic transmission range selection method of claim 13 further comprising determining the position of the first input device further based on actuation of a shift interlock input device.

15. The electronic transmission range selection method of claim 10 further comprising:

selectively sampling the third signals;

generating digital values based on the samples, respectively; and generating the first signals based on the digital values.

16. The electronic transmission range selection method of claim 15 further comprising generating the first signals further based on actuation of a shift interlock input device.

17. The electronic transmission range selection method of claim 10 further comprising generating, using at least two sensors, the second signals based on the second position of the second input device.

18. The electronic transmission range selection method of claim 10 further comprising:

selectively setting a range request to one of reverse, neutral, drive, and park based on at least one of the first and second signals;

selectively adjusting one or more operating parameters of an engine based on the range request; and controlling the transmission based on the range request.

* * * * *